US006950008B2

(12) United States Patent
Hagl et al.

(10) Patent No.: US 6,950,008 B2
(45) Date of Patent: Sep. 27, 2005

(54) AUTHENTICATION OF A FIRST TRANSCEIVER UNIT WITH RESPECT TO A SECOND TRANSCEIVER UNIT LOCATED AT A DISTANCE

(75) Inventors: Andreas Hagl, Dachau (DE); Konstantin Aslanidis, Dachau (DE)

(73) Assignee: Texas Instruments Deutschland GmbH, Freising (DE)

( * ) Notice: Subject to any disclaimer, the term of this patent is extended or adjusted under 35 U.S.C. 154(b) by 452 days.

(21) Appl. No.: 10/234,881

(22) Filed: Sep. 4, 2002

(65) Prior Publication Data

US 2003/0071717 A1 Apr. 17, 2003

(30) Foreign Application Priority Data

Oct. 4, 2001 (DE) .......................... 101 48 830

(51) Int. Cl.[7] .......................... G05B 19/00; H04Q 9/00; H04Q 5/22; B60R 25/10; H04B 17/00
(52) U.S. Cl. .................... 340/5.61; 340/5.62; 340/5.63; 340/5.64; 340/5.65; 340/10.1; 340/426.13; 455/67.1
(58) Field of Search .............................. 340/5.61, 5.62, 340/5.63, 5.64, 5.65, 10.1, 426.13; 455/67.1

(56) References Cited

U.S. PATENT DOCUMENTS

| 5,926,110 A | * | 7/1999 | Downs et al. | ............ 340/10.51 |
| 6,100,603 A | * | 8/2000 | Gold | ............ 307/10.2 |
| 6,218,932 B1 | | 4/2001 | Stippler | |
| 6,307,471 B1 | * | 10/2001 | Xydis | ............ 340/568.1 |

FOREIGN PATENT DOCUMENTS

| DE | 19850176 C1 | 8/2000 |
| WO | WO 01/89887 A1 | 11/2001 |

* cited by examiner

Primary Examiner—Michael Horabik
Assistant Examiner—Scott Au
(74) Attorney, Agent, or Firm—J. Dennis Moore; W. James Brady, III; Frederick J. Telecky, Jr.

(57) ABSTRACT

A method for the authentication of a transceiver unit with respect to a second transceiver unit, located at a distance to it. A first signal is transmitted via an aerial connected to the first unit, when second unit is located within the reception area of the first unit. The first signal is received by means of the second unit via an aerial connected to it, whereby, on the basis of the first signal received, a value is measured that characterizes the strength of the electro-magnetic field generated by the first signal at the location of the second unit. A second signal is transmitted via the aerial connected to the second unit that contains information relating to the magnitude characterizing the field strength; and the second signal is received via the aerial connected to the first unit, where, on the basis of the second signal received, a value is measured that characterizes the strength of the electro-magnetic field generated by the second signal at the location of the first unit. On the basis of the values characterizing the field strengths measured during the transmission of the first and the second signals, a comparison is made as to whether the two magnitudes of coupling corresponding to the field strengths between the two aerials coincide. Only when coincidence is established, a release signal is generated.

22 Claims, 1 Drawing Sheet

AUTHENTICATION OF A FIRST TRANSCEIVER UNIT WITH RESPECT TO A SECOND TRANSCEIVER UNIT LOCATED AT A DISTANCE

FIELD OF THE INVENTION

The invention relates to a procedure and a system for the authentication of a first transceiver unit with respect to a second transceiver unit, which is located at a distance. The first transceiver unit can, for instance, be a reading device for a transponder, while the second transceiver unit can be the transponder itself.

BACKGROUND OF THE INVENTION

To allow an individual to access a protected area, transponder-supported security systems are increasingly used. As an example, a transponder suitable for such a security system is described in EP 0 301 127 B1. An obvious example of such a system is the provision of access to a locked vehicle. The right to unlock the vehicle is to be granted only to authorized individuals. The authorized individual, in this case, carries a transponder, while a control unit is located within the vehicle, which is prompted to transmit an interrogation signal when, for example, the door handle is touched. This interrogation signal causes the transponder to transmit an identification code group, which is received and analyzed by the control unit. When the identification code group matches the identification code group stored in the control unit, the vehicle is unlocked and the individual can now open the unlocked door and so access the inside of the vehicle.

This system proves problematic in practice, as far as the security aspect is concerned. A weak spot, in particular, is the interrogation signal, which is transmitted by the control unit and causes the transponder to re-transmit its identification code group. This interrogation signal is only transmitted at very low power, so that it can be received by the transponder only when this is very close to the aerial that transmits the signal. As soon as a distance of about 2 m is exceeded, the transponder is no longer able to receive the interrogation signal, and the identification code group will not be transmitted. There is, however, a possibility to increase the required restricted distance between the aerial of the control unit and the transponder by a considerable amount, in that a reception coil, together with a connected transmission unit, is located in the proximity of the aerial by a person. This person triggers the transmission of the interrogation signal, in the example considered by touching the door handle of the vehicle, which is then routed onwards by the transmission unit. A second person, in proximity to the authorized individual, carries a receiver that receives the interrogation signal and re-transmits it by means of a transmission aerial. The transponder, carried by the authorized individual, reacts to this interrogation signal as if the authorized individual were in close proximity to the locked vehicle. It therefore transmits the identification code group, which is received and retransmitted by a transceiver carried by the second person. The transceiver carried by the first person receives the identification code group and transmits it, so that it can be received by the aerial of the control unit within the vehicle. Since the identification code group originates from the transponder of the authorized person, this process causes the unlocking of the vehicle door lock, thus enabling the non-authorized person to open the door. This fraudulent procedure is also known as "relay attack".

SUMMARY OF THE INVENTION

When shorter distances between the vehicle and the transponder are involved, an even simpler way of gleaning the code is by simply placing the ends of a loop, consisting in each case of an aerial coil, in the proximity of the transponder or, respectively, in the proximity of the vehicle, in order to glean and transmit the identification code group by inductive means. The invention rests on the requirement to provide a procedure and a system by means of which the security problems described can be avoided. In order to satisfy this requirement, the invention provides a procedure or method for the authentication of a first transceiver unit with respect to a second transceiver unit, located at a distance, by means of which a first signal is sent by the first unit via the aerial connected to it; where the second unit is located within the reception range of the first unit, the first signal is received by means of the second unit via an aerial connected to it, and on the basis of the first signal received, a value is measured that characterizes the electro-magnetic field strength generated by the first signal at the location of the second unit, and a second signal is sent by the aerial connected to the second unit, which contains the information of the value characterizing the field strength; the second signal is received by the first unit via the aerial connected to the first unit, and on the basis of the second signal received, a value is measured that characterizes the electro-magnetic field strength generated by the second signal at the location of the first unit, where the values characterizing the field strengths generated by the transmission of both the first and the second signals are compared in order to determine whether the two field strength equivalent values corresponding to the coupling between the two aerials do, in fact, coincide, whereby a release signal is generated only when coincidence is proven.

Furthermore, in order to satisfy the requirements subject of the invention, a corresponding system for the authentication of a first transceiver unit with respect to a second transceiver unit, located at a distance, to each of which is connected at least one aerial, is provided, which is characterized in that both the first transceiver unit and the second transceiver unit comprise a means by which, on reception of a signal, a value can be measured that characterizes the strength of the electro-magnetic field generated by the signal at the location of the receiving unit, and that at least one of the two transceiver units comprises a means by which, from the value measured on transmission of a signal from the first unit to the second unit, characterizing the field strength at the second unit, and from the value characterizing the field strength on transmission of a signal from the second unit to the first unit, a comparison can be made as to whether the magnitude of coupling corresponding to the two field strengths between the aerials coincides in both cases, and that there shall be a further means, which can generate a release signal when the magnitude of the two coupling ratios coincide.

In accordance with an embodiment of the invention, the authentication between the two transceiver units takes place on the basis of the physical principle of a transformer. Thereby, because of the electro-magnetic coupling between the two aerials of the two transceiver units (in the case of an inductive transfer of the flux coupling) which, for reasons of symmetry, and independent of which unit is transmitting at the time, must be coincident, a check is made as to whether the corresponding units are in communication with each other, and the authorized transmission path is not increased and bridged by codegleaning devices carried by persons.

When either of the units transmits, the receiving unit, in each case, measures the value characteristic of the field strength at the location of the receiving unit, whereby the information measured must be transmitted by at least one unit to the other, so that this can, from the field strengths measured, determine and compare the two coupling ratios. If the coupling ratios coincide, the two units match one another, and a release signal, for example to unlock a vehicle, can be generated. If fraudulent means are used to position additional units between the two corresponding transceiver units, the coupling ratios will not normally coincide, on physical grounds, and the release signal will not be emitted. In this way, the above-indicated security risk, present mainly in the case of passive-entry-RFID systems, working with transponders, can be eliminated or at least considerably reduced.

BRIEF DESCRIPTION OF THE DRAWINGS

An embodiment example of the invention shall now by explained in more detail, making reference to the drawings, where.

DETAILED DESCRIPTION OF THE INVENTION

Figure 1:
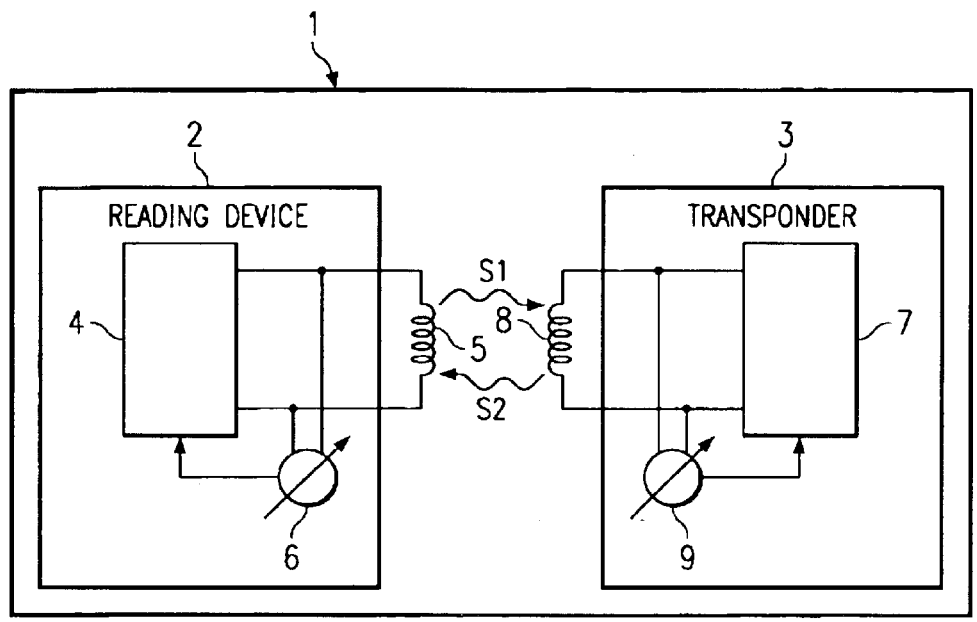
FIG. 1 is a schematic representation of a system according to the invention for the authentication of a first transceiver unit with respect to a second transceiver unit, located at a distance, and FIG. 2 plots the magnetic field strength H with respect to the distance from the aerial, as will be present in the case of a preferred development of the procedure according to the invention.

The system 1, represented in FIG. 1, for the authentication of a first transceiver unit 2 with respect to a second transceiver unit 3, located at a distance, comprises as the first transceiver unit a reading device to read a transponder, which is the second transceiver unit.

The reading device 2 contains an electronic circuit 4 that comprises a transceiver unit, not shown in the FIG. 1. The transceiver unit can, for example, generate a transmission power sufficient for the activation of, and for supplying the transponder 3 with energy, where the transmission signal for the transfer of data to the transponder 3 is modulated, and where the reception and the demodulation of signals emanating from the transponder 3 takes place. Since such transceiver units, at current technological levels, are sufficiently known, no detailed reference to this shall be made in the following.

Preferentially, the reading device 2 furthermore comprises a micro-controller with memory, not shown in FIG. 1, for the control of the reading device 2, which may, for example, control the communication sequence with a transponder 3, and which can both encode and decode the received as well as the transmitted signals.

The reading unit furthermore comprises an aerial 5 that is connected to the transceiver unit, and by means of which signals can be sent to the transponder 3 and received by the transponder 3.

Finally, the reading device 2 comprises a means 6, connected to the aerial 5, which, when receiving a signal from the transponder 3, can measure a value that characterizes the strength of the electro-magnetic field generated by the transponder signal at the location of the aerial 5 of the reading device 2, so that the means 6 can be a voltmeter. As an alternative the means 6 can, for example, also be a device for measuring the current delivered to the aerial.

The transponder 3 also comprises an electronic circuit 7, which contains a transceiver unit, not represented in FIG. 1. The transceiver unit can demodulate the signals originating from the reading device, that is the data transmitted by the transponder 3 by means of a modulator. The transponder 3 also comprises a control logic, or a micro-controller, which controls the transponder functions. A memory is also provided, which can store, for example, an identification code. Furthermore, passive transponders may contain, for example, circuit elements that rectify and then store the energy extracted from the field of the reading device 2. In the case of active transponders, an intrinsic energy supply, such as a battery, will be provided.

The transponder 3 furthermore comprises an aerial 8, which is connected to the transceiver unit, and by means of which signals can both be transmitted to the reading device 2 and/or received by the reading device 2.

Finally, the transponder 3 also comprises a means 9, connected to the aerial 8, which during the reception of a signal from the reading device 2 can measure a value that characterizes the strength of the electro-magnetic field generated by the reading device signal at the location of the aerial 8 of the transponder 3. Preferentially, this value is the aerial voltage, so that the means 9 can be a voltage measuring device. As an alternative, however, the means 9 can, for example, also be a device for measuring the aerial current.

In the case of a door-locking system for a motor vehicle, the transponder 3 can be integrated in the ignition key for the motor vehicle, and the reading device in the motor vehicle itself.

The method, according to and embodiment of the invention, for the authentication of a first transceiver unit (here the reading device) with respect to a second transceiver unit (here the transponder), located at a distance, is as follows:

At first, the reading device 2 transmits an interrogation signal S1 to the transponder 3 by means of its transceiver unit, and via the aerial 5 connected to the reading device 2. This interrogation signal S1 causes an electro-magnetic field to be generated, which is also present at the location of the aerial 8 of the transponder 3. In the present example it is assumed that the process involves an inductive coupling between the aerial 5 of the reading device 2 and the aerial 8 of the transponder 3, so that the field generated is a magnetic field. The aerials 5 and 8 shall, therefore, be preferentially magnetic aerial coils.

When the transponder 3 is within the reception area of the reading device 2, it receives the interrogation signal S1 via the aerial 8, which is connected to it. The transponder aerial voltage caused by the magnetic field generated at the aerial 5 of the reading device 2 at the location of the transponder aerial 8 is then measured by the measuring device 9, contained in the transponder 3, to be subsequently stored in the transponder 3. The transponder aerial voltage measured represents a measure of the strength of the signal received, and therefore of the magnitude of the magnetic field generated by the reading device aerial 5 at the location of the transponder aerial 8.

Following this, a second signal S2 is transmitted, via the transponder aerial 8, by the transceiver unit contained within the transponder 3. This second signal, which uses the same carrier frequency as the first signal S1, contains, in modulated form, the information relating to the transponder aerial voltage measured when the first signal S1 was transmitted, and can furthermore, preferentially, include an identification code stored in the transponder memory.

The reading device 2 now receives the second signal S2 by means of the transceiver unit incorporated into it, via the aerial 5 and, by measuring this signal, determines the reading device aerial voltage generated by means of the voltage measuring device 6. The measured reading device aerial voltage represents a measure of the strength of the signal S2 received, and therefore of the magnitude of the magnetic field generated by the transponder aerial 5 at the location of the reading device aerial 8. The measured value of the reading device aerial voltage will be stored in the reading device 2. It is preferable that, apart from the information relating to the transponder aerial voltage received, as measured at the time of the transmission of the signal S1, also the identification code, transmitted with the second signal S2 is read by the reading device 2. Both the values will also be stored in the reading device 2.

The micro-controller contained in the reading device 2 now checks, on the basis of the voltage at the aerial of the transponder or of the reading device, respectively, characterizing the magnetic field strengths measured when the first signal S1 and the second signal S2 were transmitted, whether the magnitude of the flux coupling, corresponding in each case to the two measured aerial voltages, between the two aerials coincides. If the signals S1 and S2 are exchanged in immediate temporal succession between the same units, that is when, apart from the transponder 3 and the reading device 2, no further units are involved in the intercommunication, it follows that for physical reasons, the magnitude of the flux coupling, generally expressed in terms of the so-called coupling factor, must be the same in both cases, that is the magnetic effect of the current-carrying aerial 5 of the reading device 2, when transmitting the first signal S1, on the receiving aerial 8 of the transponder 3 is symmetrical to the magnetic effect of the current-carrying aerial 8 of the transponder 3, when transmitting the second signal S2, on the receiving aerial 5 of the reading device 2. The magnitude of the coupling factor depends on the geometrical dimensions of the two coil aerials and their position (distance, orientation) with respect to each other, as well as on the magnetic properties of the medium present between the transponder 3 and the reading device 2.

The memory connected to the micro-controller of the reading device 2 preferentially contains a stored reference table in which such transponder aerial voltages are correlated with reading device aerial voltages, possibly present during the transmission of the first signal S1 at the reading device 2, that may be expected at the transponder during the transmission of the second signal, when the magnitude of the coupling, expressed, for example, by the coupling factor, is constant between the aerials in both cases of transmission (S1, S2).

The coupling factor k between the two magnetic aerial coils 5, 8 of both the reading device 2 and that of the transponder 3 can, in principle, be expressed in the form of the following equation:

$$k = A_k \cdot \frac{U_T}{U_L} \cdot \sqrt{\frac{L_L}{L_T}} \qquad (1)$$

Here, $U_T$ is the voltage present at the transponder aerial coil 8, $U_L$ is the voltage present at the reading device aerial coil 5, $L_T$ is the inductance of the transponder aerial coil 8, and $L_L$ is the inductance of the reading device aerial coil 5, where $A_K$ is a correction factor.

If the expression $U_{TS1}$ is used to designate the voltage of the transponder, measured at the transponder aerial coil during the transmission of the first signal S1 from the reading device to the transponder, and $U_{LS2}$ is used to designate the voltage of the reading device as measured at the reading device aerial coil during the transmission of the second signal S2 from the transponder to the reading device, it results that, on the assumption that the corresponding aerial voltages of the transmitting aerials $U_{LS1}$ (voltage at the reading device aerial coil during the transmission of the first signal) and $U_{TS2}$ (voltage at the transponder aerial coil during the transmission of the second signal) are known, and the coupling factor k is constant, the following relationship applies when taking into account the equation (1):

$$U_{TS1} = \acute{a} \cdot U_{LS2} \qquad (2)$$

wherein $\acute{a}$ represents a constant easily calculated.

With the aid of this equation (2) it is now a simple matter to generate a look-up table, which enables the computation and correlation of the reading device aerial voltages $U_{LS2}$ with respect to the possibly present transponder aerial voltages $U_{TS1}$ that can be expected when the coupling factor is constant.

The micro-controller of the reading device now checks, with the help of the look-up table, the transponder aerial voltage $U_{TS1}$, transmitted together with the second signal, together with the reading device aerial voltage $U_{LS2}$ measured at the reading device, as to whether the coupling factors coincide. If, to the measured transponder aerial voltage $U_{TS1}$, the reference table contains a correlated reading device aerial voltage $U_{LS2}$ that corresponds to the measured reading device aerial voltage $U_{LS2}$, this then means that the coupling factors for both transmission cases (S1, S2) coincide, and it is therefore ensured that the transponder is authenticated with respect to the reading device. In this case, the reading device generates a release signal.

If the transponder is integrated in the ignition key of a motor vehicle, and the reading device is in the motor vehicle itself, the release signal can then, for example, be used to enable access to the motor vehicle, or enable the motor vehicle to be locked.

Preferentially, before generating the release signal, the reading device will also check whether an identification code, transmitted to the reading device with the second signal and stored in the transponder, matches an identification code stored in the reading device 2, and will generate the release signal only if and when both the coupling factors, as well as the identification codes correlate to each other.

If, as previously described as a "relay attack", a fraudulent person attempts to trigger the release signal by interposing two further transceiver units, the coupling ratios as determined by the aerial voltages measured in both the transponder and in the reading device will normally not coincide, so that the two measured voltages $U_{TS1}$ and $U_{LS2}$ cannot be correlated in the reference table, and no release signal is generated.

Figure 2:
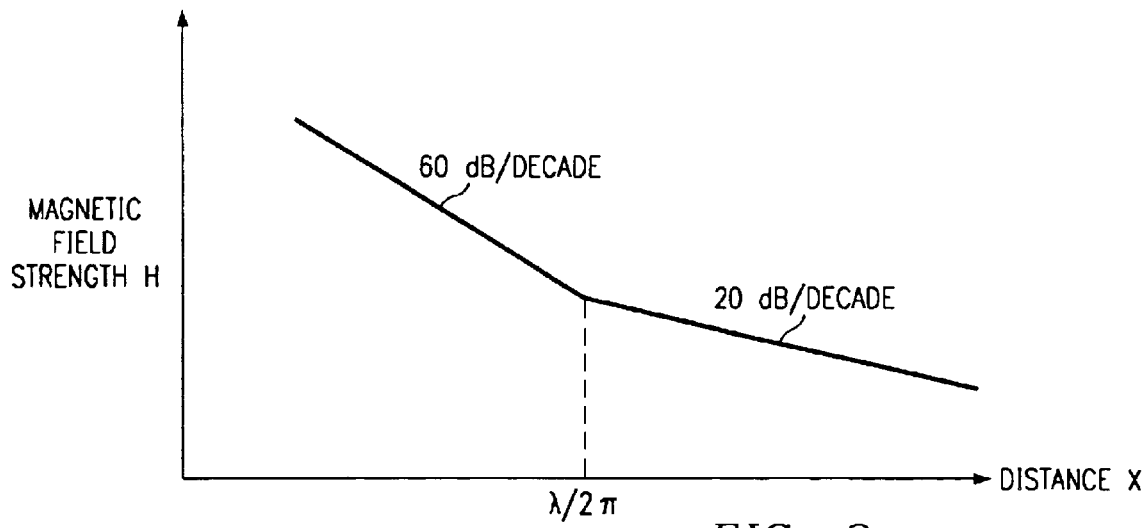

The procedure according to the invention is particularly suitable for use within the short-range field ($x<\ddot{e}/2\eth$), $\ddot{e}$=wave length of the signals) of magnetic aerial coils where the attenuation of the magnetic field strength is around 60 dB per decade of the distance (x) from the aerial, since under these conditions the coupling factors already change considerably at small changes in distance. In such a case, even a limited resolution capability of the devices 6, 9, measuring the aerial voltage, can in certain circumstances be sufficient to carry out the procedure within a satisfactory safety margin. FIG. 2 plots the magnetic field strength H with respect to the distance from the aerial as it occurs in the case of a magnetic aerial coil. In the long-range field, the attenuation of the magnetic field strength decreases markedly, and will then only be of 20 dB per decade of the distance (x) from the aerial.

With the procedure and system according to the invention so far described, there is, in purely theoretical terms, also the danger that a symmetrical loop, to whose ends are connected two identical coils, is placed in a completely symmetrical arrangement between the reading device and the transponder, that is that the coils must be in each case at the same distance and in the same position to the transponder aerial coil and to the reading device aerial coil, respectively. In this case, which in practice can, of course, not be realistically realized, the security system according to the invention could possibly be deceived, since here both the coupling ratios resulting from the transmission of the first and the second signals would also be identical. If even this possibility is to be excluded, one or more further aerials could be connected to the transponder and/or the reading device that are arranged at an angle with respect to the other aerial or the other aerials. The procedure according to the invention would then follow successive process phases between the aerials of both the reading device and the transponder, correlated because of their location with respect to each other, whereby, on the basis of the measured aerial voltage during the transmission of the first and the second signal between two correlated aerials of the reading device and the transponder, a check would be made as to whether the two corresponding magnitudes of coupling between the two aerials, belonging to an aerial pair, coincide, and the release signal would be generated only when the magnitudes of the coupling between each pair of correlated aerials coincide.

Both the authentication procedure and the authentication system according to the invention may be modified in a plurality of ways, as will be easily appreciated by the expert. This means, for example, that instead of the aerial voltage, the aerial current can be measured, or any other value, as long as it represents the strength of the magnetic field at the location of the aerial receiving a signal. In the case of systems where one of the two transceiver units is in a continuous transmitting mode, it may be necessary to determine the value characterizing the electric field strength not on the basis of the carrier frequency, but only from the modulating signal. This value determination will then not be possible as represented in FIG. 1, whereby the measuring device is directly connected to the aerial, but will take place in the receiver integrated in the respective device.

It is furthermore not even essential to use a look-up table in order to determine whether the two coupling magnitudes coincide. It is therefore also possible to compute and compare coupling factors belonging to the two measured aerial voltages, representing the field strengths, in the microcontroller of the reading device, on the basis of the measured aerial voltage values. For the computations, apart from the measured aerial voltages at the location of the corresponding receiving devices (reading device, transponder), use can be made of predetermined constants that describe the aerial voltages (and therefore the field strength) at the location of the corresponding transmitting aerial of the devices (reading device, transponder). In accordance with a further embodiment variant, the aerial voltages (and therefore the field strength) at the location of the corresponding transmitting aerial of the devices (reading device, transponder) can also be measured at the location of the corresponding transmitting device by means of the measuring devices 6 and 9, whereby the information of the aerial voltage measured at the location of the transponder during the transmission of the second signal, is also transmitted to the reading device.

Furthermore, additional security measures can complement the procedure according to the invention, in that, for example, the second signal, from the transponder to the reading device, is transmitted in encoded form.

Apart from the above-described application for a vehicle door security system, a plurality of further applications of the procedure according to the invention are conceivable.

It can, for example, be integrated into a credit card payment system, whereby the transponder is integrated in the credit card, and the reading device in a credit card reading device, and the release signal thereby enabling a financial transaction to be processed.

What is claimed is:

1. Method for the authentication of a first transceiver unit with respect to a second transceiver unit, located at a distance, comprising:

by means of the first unit a first signal is transmitted via an aerial, connected to it;

when the second unit is within the reception range of the first unit, the first signal is received by means of the second unit via an aerial connected to it, and on the basis of the first signal received, a value is measured that characterizes the electro-magnetic field strength generated by the first signal at the location of the second unit, and a second signal is transmitted via the aerial connected to the second unit, which contains the information of the value characterizing the field strength;

the second signal is received by the first unit via the aerial connected to the first unit, and on the basis of the second signal received, a value is measured that characterizes the electro-magnetic field strength generated by the second signal at the location of the first unit, where the values characterizing the field strengths generated by the transmission of both the first and the second signals are compared in order to determine whether the two field strength equivalent values corresponding to the coupling between the two aerials do, in fact, coincide, whereby a release signal is generated only when coincidence is determined.

2. Method according to claim 1 where the second unit is a transponder, and the first unit is a reading device for this transponder.

3. Method according to claim 1 where the value characterizing the magnitude of the electro-magnetic field strength is the aerial voltage.

4. Method according to claim 1 where the value characterizing the magnitude of the electro-magnetic field strength is the aerial current.

5. Method according to claim 1 wherein the aerial coupling is inductive (in the way of a transformer), so that the electro-magnetic field generated is a magnetic field.

6. Method according to claim 5 wherein the aerials are magnetic coil aerials.

7. Method according to claim 6 wherein the attenuation of the magnetic field strength at the aerials within the short-range field ($x<(\ddot{e}/2\delta)$, $\ddot{e}$=wave length) is in the region of 60 dB per decade of the distance (x) from the aerial.

8. Method according to claim 3, wherein a look-up table is stored in the first unit in which pre-determined aerial voltages expected to be present at the second unit during the transmission of the first signal are correlated to such aerial voltages as may be expected at the first unit during the transmission of the second signal, when the magnitude of the coupling between the aerials in both transmission cases is constant, and where the look-up table is used to check whether the coupling magnitudes measured on the basis of the values characterizing the field strength are coincident.

9. Method according to claim 1 wherein, for the purpose of checking whether both the magnitudes of the coupling between the two aerials corresponding to their respective field strengths coincide, the coupling factors relating to the two field strength values are computed and compared with respect to each other.

10. Method according to claim 9 where, apart from the values characterizing the field strengths at the location of the receiving devices, the computations involved make use of pre-determined constants describing the field strength at the location of the transmitting aerial in each case.

11. Method according to claim 9 wherein, apart from the measured values characterizing the field strengths at the location of the receiving units, values at the location of the corresponding transmitting device, describing the field strength at the location of the actually transmitting aerial, are also measured, whereby the information relating to the field strength measured during the transmission of the second signal at the location of the second unit is also transmitted to the first unit at the location of the aerial connected to the second unit.

12. Method according claim 11 where the second signal furthermore comprises an identification code stored in the second unit, whereby the first unit generates the release signal only when the identification code also matches the identification code stored in the first unit.

13. Method according to claim 11 where the second signal is encoded in the second unit before it is transmitted, and decoded by the first unit before it is read.

14. Method according to claim 11, where both the first signal and the second signal have the same carrier frequency.

15. Method according to claim 1, where several aerials, at an angle to each other, are arranged at both the first unit and the second unit, and where the procedure according to one of the previous claims proceeds in each case in succession between two aerials of the first unit and of the second unit, correlated on account of their disposition with respect to each other, where by measuring the values characterizing the field strengths generated during the transmission of the first and the second signal between two aerials, correlated to each other, of the first and of the second unit, a check is made as to whether the two field strength magnitudes of the coupling between the aerials pertaining to one aerial pair coincide, and where the release signal is generated only when the magnitude of the coupling factors between each pair of correlated aerials coincides.

16. Method according to claim 2, where the transponder is integrated in the ignition key of a motor vehicle, and the reading device in the motor vehicle itself, and whereby the release signal serves to enable access to the motor vehicle or to lock the motor vehicle.

17. Method according to claim 2, where the transponder is integrated in a credit card, and the reading device in a credit card reading device, whereby the release signals enables financial transactions to be processed.

18. System for the authentication of a first transceiver unit with respect to a second transceiver unit, located at a distance to it, to each of which at least one aerial will be connected, characterized in that both the first and the second transceiver units will each comprise a means by which, on reception of a signal, a value can be measured that characterizes the strength of the electro-magnetic field generated by the signal at the location of the receiving unit, and at least one of the two transceiver units comprises a means by which, from the value measured on transmission of a signal from the first unit to the second unit, characterizing the field strength at the second unit, and from the value characterizing the field strength on transmission of a signal from the second unit to the first unit, a comparison can be made as to whether the magnitude of coupling corresponding to the two field strengths between the aerials coincides in both cases, and that there shall be a further means, which can generate a release signal when the magnitude of the two coupling ratios coincide.

19. System according to claim 18, wherein the second unit is a transponder, and the first unit is a reading device for such a transponder.

20. System according to claim 18, where the first and the second unit furthermore comprise a memory in which is stored an identical identification code, and whereby the means of generating the release signal is configured in such a way that it outputs a release signal only when it is confirmed by the first unit that the identification code stored in the second unit and transmitted to the first unit also matches the identification code stored in the first unit.

21. System according to claim 20 wherein the system is for a motor vehicle, and wherein the transponder is integrated in the ignition key of a motor vehicle, and the reading device in the motor vehicle itself, and where the release signal provides access to the motor vehicle or causes the motor vehicle to be locked.

22. System according to claim 20 wherein the system is a credit card payment system, wherein the transponder is integrated in a credit card and the reading device in a credit card reading device, and where the release signal enables financial transactions to be processed.

* * * * *